(12) United States Patent  
Criscuolo et al.

(10) Patent No.: US 8,567,963 B1  
(45) Date of Patent: Oct. 29, 2013

(54) SYSTEM FOR A SELF-CLEANING/WIPING PROTECTIVE DOME INTEGRATED INTO AN OUTDOOR CAMERA HOUSING

(71) Applicants: Michael Thomas Criscuolo, Long Beach, CA (US); Timothy Karl Sears, Solana Beach, CA (US)

(72) Inventors: Michael Thomas Criscuolo, Long Beach, CA (US); Timothy Karl Sears, Solana Beach, CA (US)

( * ) Notice: Subject to any disclaimer, the term of this patent is extended or adjusted under 35 U.S.C. 154(b) by 0 days.

(21) Appl. No.: 13/801,575

(22) Filed: Mar. 13, 2013

(51) Int. Cl.  
*G02B 1/00* (2006.01)

(52) U.S. Cl.  
USPC .......................................................... 359/507

(58) Field of Classification Search  
USPC ........................................ 359/507; 239/284.2  
See application file for complete search history.

(56) References Cited

U.S. PATENT DOCUMENTS

2002/0005440 A1* 1/2002 Holt et al. .................. 239/284.2

\* cited by examiner

*Primary Examiner* — Euncha Cherry  
(74) *Attorney, Agent, or Firm* — Sinorica, LLC

(57) ABSTRACT

A system for a self-cleaning/wiping protective dome being integrated into an outdoor camera housing is an apparatus that is used to protect a camera assembly from moisture, weather conditions, and other environmental conditions. The apparatus includes a rotatable dome, a driving mechanism, a fixed wiper assembly, a dispensing mechanism, an enclosure, a mounting bracket, and a remote relay control device. The fixed wiper blade is pressed against the rotatable dome so that the fixed wiper blade cleans the exterior of the rotatable dome as the driving mechanism revolves the rotatable dome. The dispensing mechanism sprays wiper fluid onto the rotatable dome. The remote relay control device is used to electronically control and command the driving mechanism and the dispensing mechanism. The enclosure houses the components that could be affected by environmental factors. The mounting bracket attaches to the apparatus to an elevated structure such as a pole.

17 Claims, 9 Drawing Sheets

SYSTEM FOR A SELF-CLEANING/WIPING PROTECTIVE DOME INTEGRATED INTO AN OUTDOOR CAMERA HOUSING

FIELD OF THE INVENTION

The present invention relates generally to outdoor housings for camera systems. More specifically, the present invention presses a fixed wiper blade against a rotating protective dome, which allows the present invention to automatically clean the protective dome.

BACKGROUND OF THE INVENTION

Existing outdoor cameras that communicate over different mediums via various protocols including Internet Protocol (IP), analog cabling, digital signaling, and fiber optic networks are relatively expensive and have design options that are fixed or limited. Meanwhile, indoor cameras typically provide the same technical features as the outdoor version and are less expensive because they are not packaged to withstand the external environment. These cameras have a number of other advantages including higher resolutions and highly compressed video, which greatly increases image quality. Therefore, the objective of the present invention is to provide camera systems used in outdoor environments with a self-wiping/self-cleaning protective dome system, which can be encapsulated within an enclosure for the outdoors that protects the camera from moisture, weather, and environmental conditions.

Traditionally, the task of cleaning the protective dome is manually accomplished, wherein a person physically accesses the protective dome. Most likely, the enclosure will be positioned off the ground such as on a pole, a building roof, walls of structures, other elevated structures, or in remote areas. A person typically encounters unsafe situations having to reach up to the protective dome or make time consuming and expensive trips to the camera systems in order to clean the protective dome with conventional cleaning items such as water and a towel. Thus, the objective of the present invention is to self-clean and wipe clear of rain off of the protective dome around these cameras, which eliminates the labor and travel cost of manually cleaning the protective dome, improves the image quality of the video and reduces the risk of bodily injury for those people trying to clean camera systems mounted in precarious locations. The present invention mechanically rotates the protective dome, which allows a fixed wiper to clean the outer surface of the protective dome. The self-cleaning feature of the present invention removes precipitation from rainfall that can accumulate on the protective dome and can obstruct the visibility through the protective dome. The self-cleaning feature can also spray wiper fluid onto the protective dome in order to clean an accumulation of grungy debris such as dust or salt spray. When the protective dome rotates, the combination of the wiper fluid and the fixed wiper cleans the protective dome and restores a clear view for the camera.

DETAIL DESCRIPTIONS OF THE INVENTION

Figure 1:
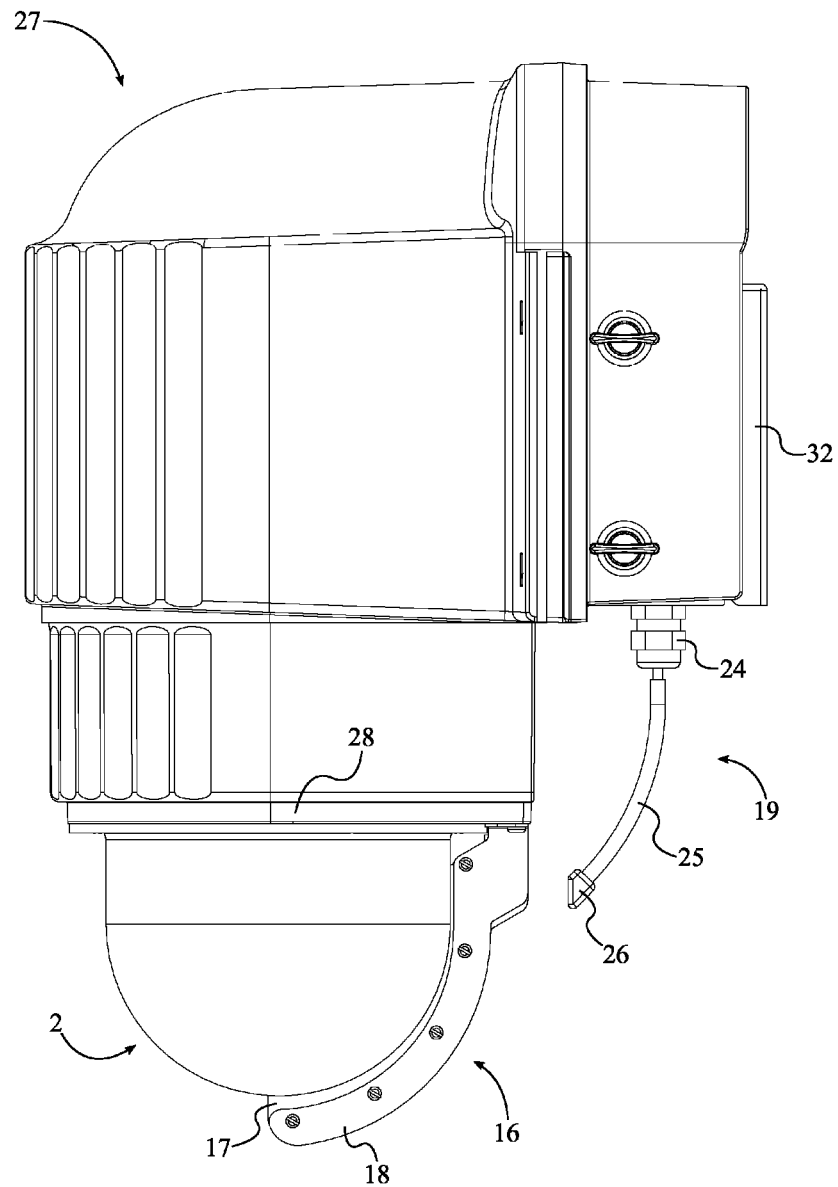
FIG. 1 is a side view of the present invention.

All illustrations of the drawings are for the purpose of describing selected versions of the present invention and are not intended to limit the scope of the present invention.

As can be seen in FIG. 1 through 9, the present invention is a system for a self-cleaning/wiping protective dome integrated into an outdoor camera housing, which uses an electromechanical device to rotate the protective dome against a fixed wiper in order to clean the outside surface of the protective dome. The present invention mainly comprises a rotatable dome 2, a driving mechanism 10, a fixed wiper assembly 16, a wiper fluid dispensing mechanism 19, an enclosure 27, and a remote relay control device 31. The rotatable dome 2 protects a camera assembly 1 from being damaged by outside elements while the camera assembly 1 visually records the area surrounding the present invention. The fixed wiper assembly 16 is used to clean the outer surface of the rotatable dome 2 as the driving mechanism 10 revolves the rotatable dome 2 around the camera assembly 1. The wiper fluid dispensing mechanism 19 is used to spray wiper fluid onto the rotatable dome 2, which helps to clean the rotatable dome 2. The remote relay control device 31 is used to regulate how long the driving mechanism 10 will revolve the rotatable dome 2 and at what intervals. The remote relay control device 31 is also used to manage when to activate the wiper fluid dispensing mechanism 19. The enclosure 27 is a base structure for the present invention, and the mounting bracket 32 is used to attach the present invention high above the ground onto an elevated structure such as a pole or a building roof.

Figure 2:
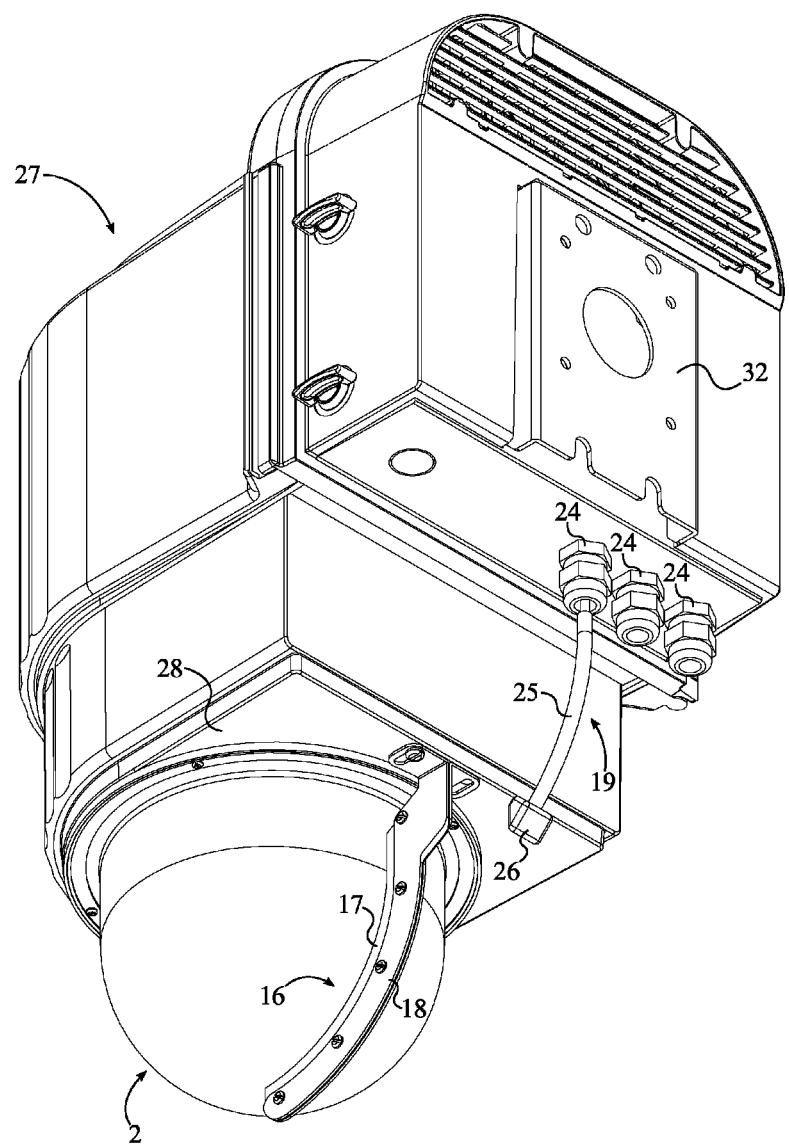
FIG. 2 is a bottom perspective view of the present invention.

The enclosure 27 is also used to house and properly situate the other components of the present invention and is shown in FIGS. 1 and 2. In addition, the enclosure 27 can house additional accessories for the present invention. For example, the remote relay control device 31 will be mounted within the enclosure 27. The enclosure 27 comprises a support section 28, a dome hole 29, and a second race 30. The support section 28 is the portion of the enclosure 27 that is used to brace the rotatable dome 2 against the enclosure 27. In the preferred embodiment of the present invention, the support section 28 is located on the bottom of the enclosure 27. The dome hole 29 allows the rotatable dome 2 and the camera assembly 1 to protrude through the enclosure 27. The dome hole 29 is positioned through the support section 28. The second race 30 is used to guide the movement of the rotatable dome 2. In order to maintain the proper movement for the rotatable dome 2, the second race 30 is concentrically positioned around the dome hole 29. Furthermore, the mounting bracket 32 is positioned outside of the enclosure 27 and is connected to the enclosure 27, which allows the mounting bracket 32 to properly brace the present invention onto an elevated structure. In some embodiments of the present invention, the enclosure 27 can further comprise a vent, which is positioned away from the support section 28 on the enclosure 27. The vent can be used to release heat that has accumulated within the enclosure 27.

Figure 7:
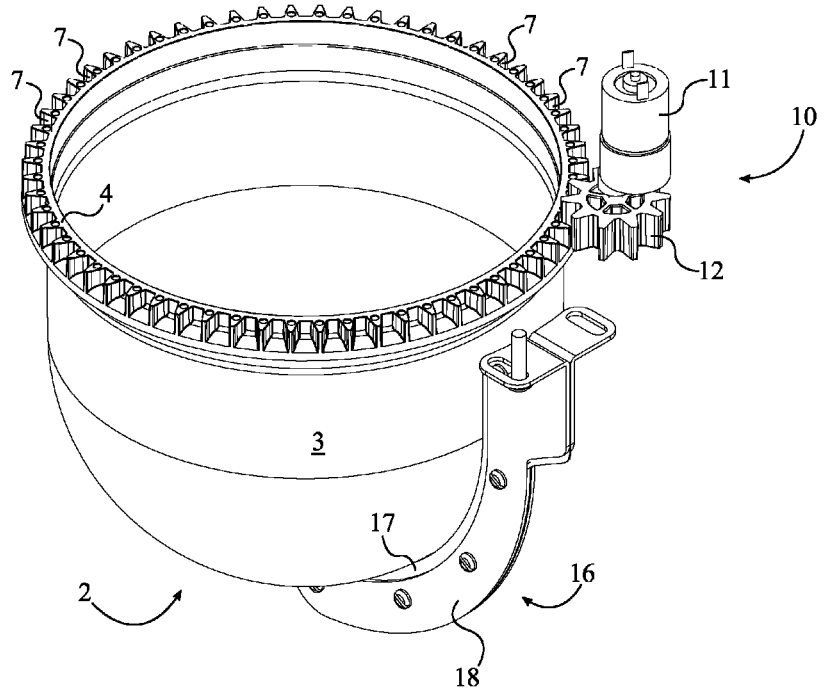
FIG. 7 is a top perspective view of the rotatable dome, the fixed wiper assembly, and the driving mechanism for the present invention.
Figure 8:
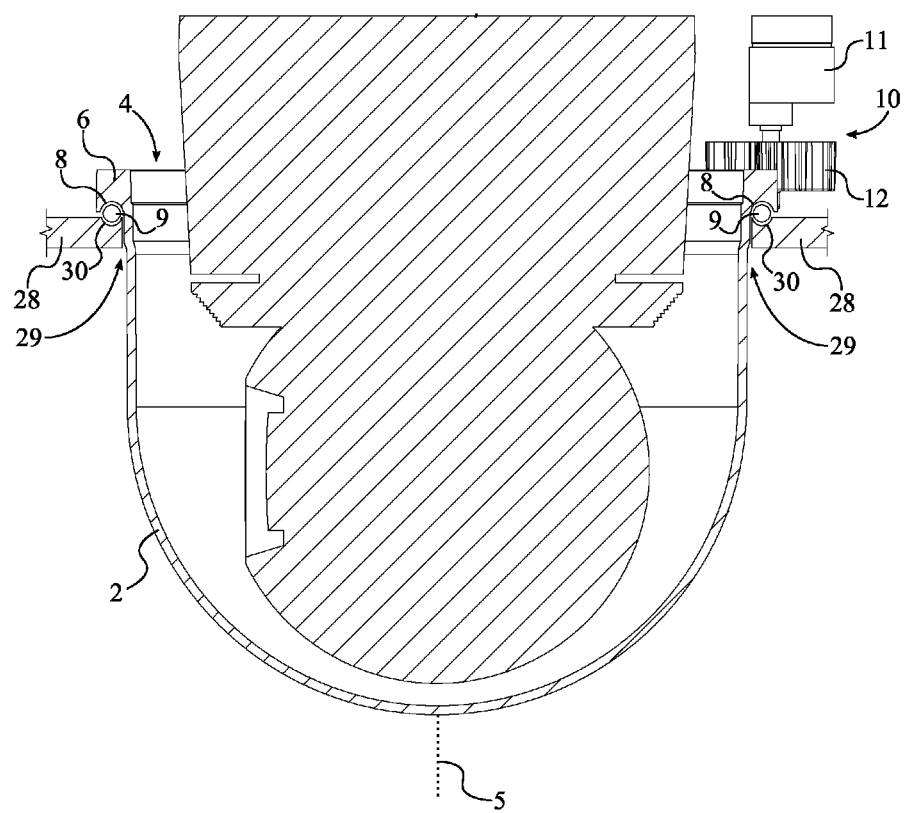
FIG. 8 is a side cross-sectional view of the rotatable dome, the driving mechanism, and the support section of the enclosure for the present invention.

The camera assembly 1 is mounted to the enclosure 27 and traverses into the rotatable dome 2. As can be seen in FIGS. 7 and 8, the rotatable dome 2 comprises a hemispherical bubble 3, an annular flange 6, a plurality of gear teeth 7, a first race 8, and a plurality of ball bearings 9. The hemispherical bubble 3 is a partially transparent shell that protects the camera assembly 1, while the camera assembly 1 is visually recording the surrounding area. The hemispherical bubble 3 comprises a top rim 4 and a bottom pole 5, which are used to appropriately reference the hemispherical bubble 3. The bottom pole 5 is the bottom extremity of an axis that centrally traverses through the hemispherical bubble 3. The top rim 4 is positioned opposite to the bottom pole 5 on the hemispherical bubble 3. The annular flange 6 is radially positioned around the bottom pole 5 and is perimetrically connected to the top rim 4. The annular flange 6 is used to support the weight of the hemispherical bubble 3 against the support section 28 once the hemispherical bubble 3 traverses through the dome hole 29. Thus, the annular flange 6 must be located within the enclosure 27. The plurality of gear teeth 7 is radially integrated around the annular flange 6 so that the driving mechanism 10 can revolve the rotatable dome 2 by individually engaging each of the plurality of gear teeth 7.

The rotatable dome 2 is able to freely revolve about the bottom pole 5 because of the configuration of the following components. The plurality of ball bearings 9 is evenly distributed around the hemispherical bubble 3 and is positioned in between the annular flange 6 and the support section 28. Consequently, the plurality of ball bearings 9 rolls in between the annular flange 6 and the support section 28, which allows the hemispherical bubble 3 to revolve about the bottom pole 5. The plurality of ball bearings 9 engages the first race 8 and the second race 30, which are grooves that guide the rolling movement for the plurality of ball bearings 9. The first race 8 traverses into the annular flange 6 parallel to the bottom pole 5 and is concentrically positioned around the hemispherical bubble 3. The second race 30 traverses into the support section 28 parallel to the bottom pole 5. The second race 30 is also aligned with the first race 8, which allows the plurality of ball bearings 9 to smoothly roll in between the annular flange 6 and the support section 28. The configuration of the first race 8 and the second race 30 allows the plurality of ball bearings 9 to support the axial load of the hemispherical bubble 3, while still revolving the hemispherical bubble 3 about the bottom pole 5.

Figure 6:
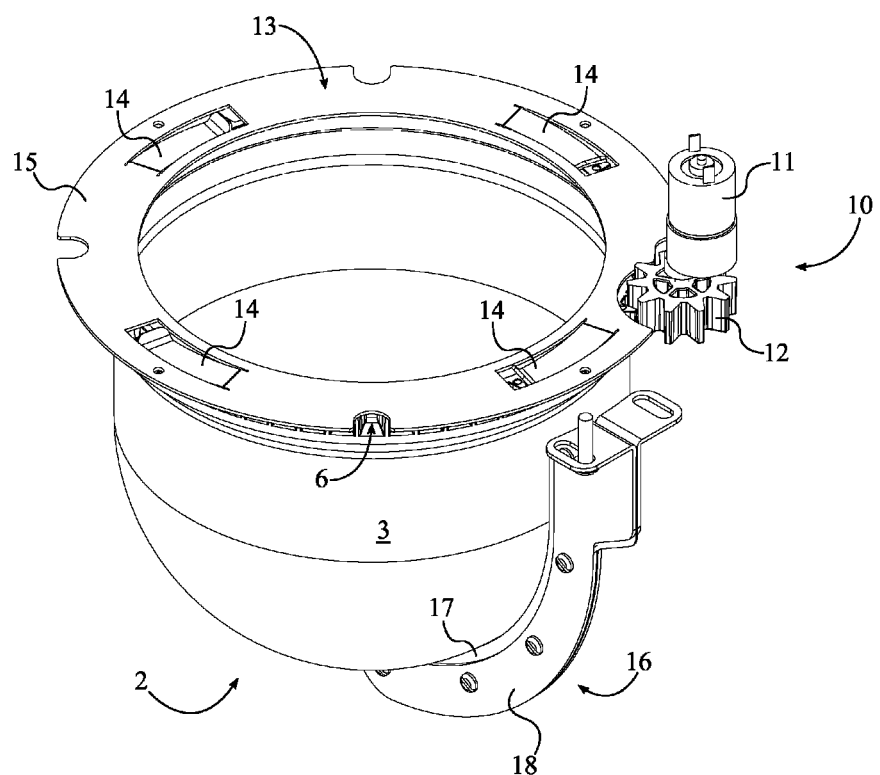
FIG. 6 is a top perspective view of the rotatable dome, the fixed wiper assembly, the driving mechanism, and the retaining spring bracket for the present invention.

As can be seen in FIG. 6, the retaining spring bracket 13 is used apply a downward force onto the annular flange 6 so that the plurality of ball bearings 9 remains properly engaged to the first race 8 and the second race 30. Thus, the retaining spring bracket 13 must be positioned adjacent to the annular flange 6 opposite to the support section 28. The retaining spring bracket 13 comprises an annular base 15 and a plurality of springy portions 14. The annular base 15 is the structural component of the retaining spring bracket 13 and is shaped in a similar size to the annular flange 6 so the annular base 15 can be concentrically positioned to the annular flange 6. The annular flange 6 should be fastened to the support section 28 so that the retaining spring bracket 13 does not rotate while the hemispherical bubble 3 is rotating. The plurality of springy portions 14 provides the downward force onto the annular flange 6. The plurality of springy portions 14 is radially integrated into the annular base 15 so that the downward force is evenly distributed onto the annular flange 6. As a result, the annular flange 6 is pressed against the plurality of ball bearings 9 by the plurality of springy portions 14.

The driving mechanism 10 provides the present invention with the rotational power to revolve the rotatable dome 2. The driving mechanism 10 comprises a direct current (DC) motor 11 and a motor gear 12, which are shown in FIGS. 6, 7, and 8. Both the DC motor 11 and the motor gear 12 are located within the enclosure 27, which allows the driving mechanism 10 to more efficiently transfer rotational power to the rotatable dome 2. The DC motor 11 is used to generate the rotational power and is mounted to the enclosure 28. The motor gear 12 is used to transfer the rotational power from the DC motor 11 to the rotatable dome 2. Thus, the motor gear 12 is axially connected to the DC motor 11 and engages the plurality of gear teeth 7 around the annular flange 6.

As can be seen in FIG. 1 through 7, the fixed wiper assembly 16 is permanently positioned in one place on the present invention, which allows the fixed wiper assembly 16 to clean the hemispherical bubble 3 as the driving mechanism 10 revolves the rotatable dome 2. More specifically, the fixed wiper assembly 16 is positioned opposite the front lens of the camera assembly 1 so that the fixed wiper assembly 16 does not obstruct the view of the front lens. The fixed wiper assembly 16 comprises a wiper blade 17 and a wiper arm 18. The wiper blade 17 is lightly pressed against the hemispherical bubble 3 in order to wipe the rotatable dome 2, which improves the clarity of visual recording by the camera assembly 1. The wiper arm 18 is used to securely stabilize the wiper blade 17 against the hemispherical bubble 3. The wiper blade 17 is replaceable and thus is attached along the wiper arm 18 so that an old wiper blade can be detached from the wiper arm 18 and can be replaced with a new wiper blade. In the preferred embodiment of the present invention, the wiper blade 17 and the wiper arm 18 are shaped with a curvature that matches the curvature of the hemispherical bubble 3. The fixed wiper assembly 16 stays situated by adjustably fastening the wiper arm 18 to the enclosure 28 adjacent to the rotatable dome 2. The wiper arm 18 can be unfastened and readjusted on the enclosure 27 in order to change the positioning of the fixed wiper assembly 16.

Figure 3:
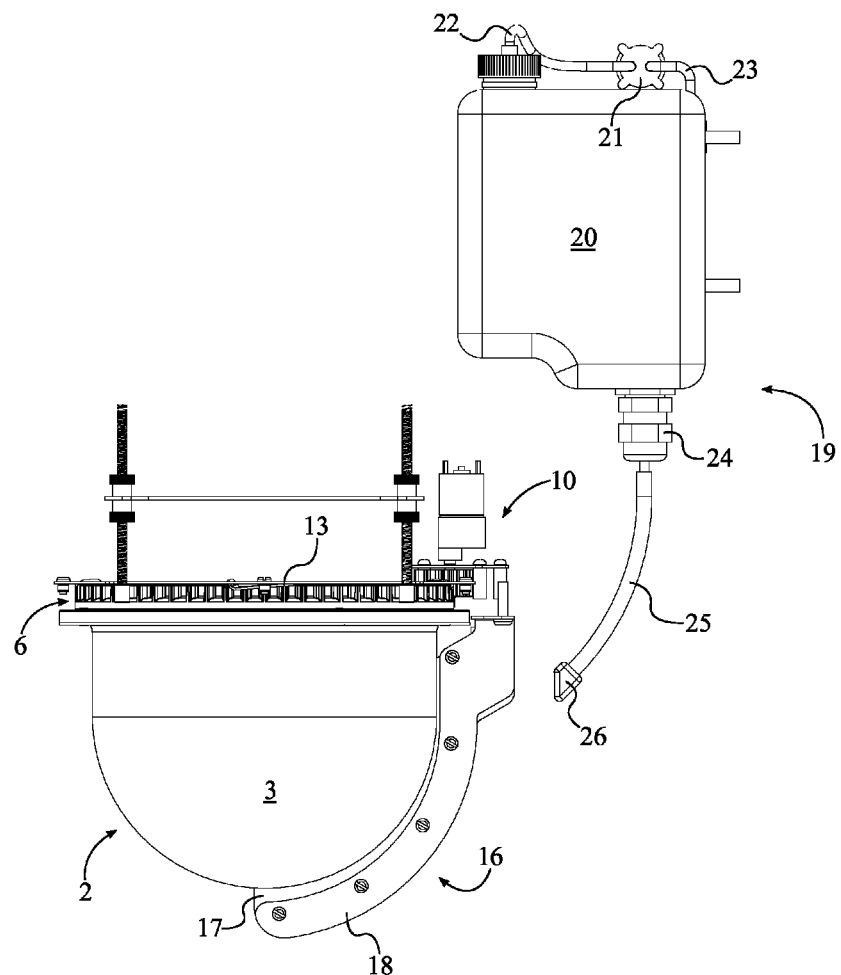
FIG. 3 is a side view of the present invention without the enclosure.
Figure 4:
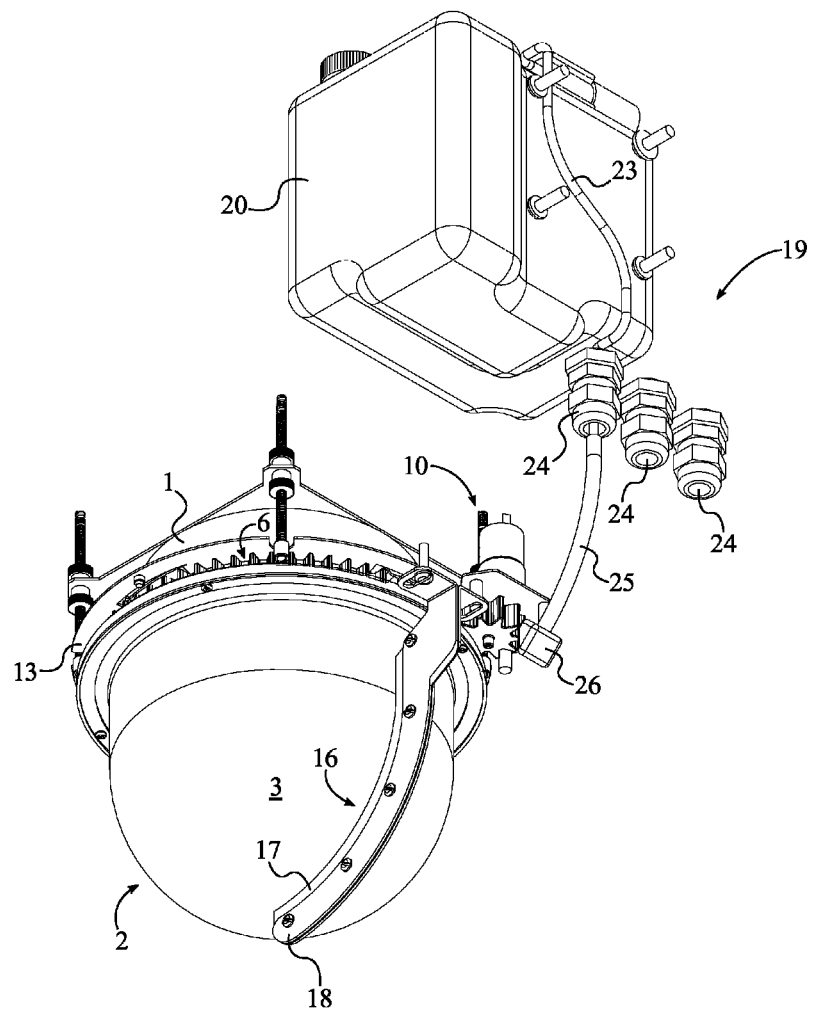
FIG. 4 is a bottom perspective view of the present invention without the enclosure.
Figure 5:
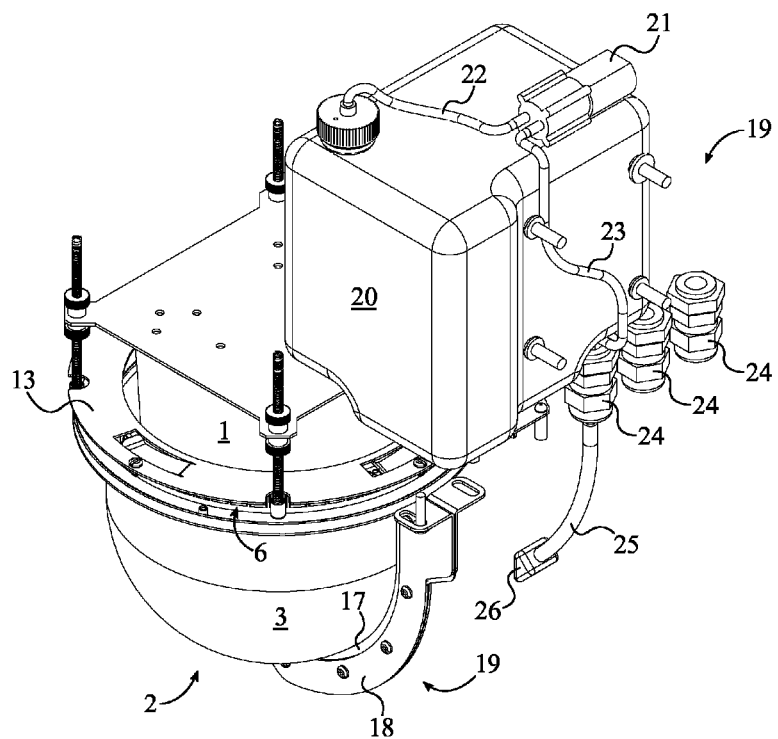
FIG. 5 is a top perspective view of the present invention without the enclosure.

The wiper fluid dispensing mechanism 19 is used to spray wiper fluid onto the hemispherical bubble 3 in order to assist in cleaning the hemispherical bubble 3 as the driving mechanism 10 revolves the rotatable dome 2. The wiper fluid dispensing mechanism 19 comprises a fluid reservoir 20, a pump 21, an input tube 22, an output tube 23, an at least one bulkhead fitting 24, an adjustable spray tube 25, and a spray nozzle 26, which are illustrated in FIGS. 3, 4, and 5. The fluid reservoir 20 is used to store and provide wiper fluid to the present invention when necessary. The fluid reservoir 20 is mounted within the enclosure 27 so that a user can easily access the fluid reservoir 20 by opening the enclosure door 32 and can easily refill the fluid reservoir 20 with wiper fluid. The pump 21 is used to hydro-dynamically force the wiper fluid through the wiper fluid dispensing mechanism 19. The pump 21 is in fluid communication with the fluid reservoir 20 through the input tube 22. The input tube 22 is a means for the wiper fluid to travel from the fluid reservoir 20 to the pump 21. Consequently, one end of the input tube 22 traverses into the fluid reservoir 20, and the other end of the input tube 22 is coupled to the pump 21. The at least one bulkhead fitting 24 traverses through and is connected to the enclosure 27, which provides the present invention with a water-tight opening through the enclosure 27. The at least one bulkhead fitting 24 allows the wiper fluid to pass through the enclosure 27. If the present invention has multiple bulkhead fittings, then the present invention can allow other components to traverse through the enclosure 27 such as electrical wires. The at least one bulkhead fitting 24 is in fluid communication with the pump 21 through the output tube 23. The output tube 23 is a means for the wiper fluid to travel from the pump 21 to the at least one bulkhead fitting 24. Consequently, one end of the output tube 23 is coupled to the pump 21, and the other end of the output tube 23 is coupled to the at least one bulkhead fitting 24. The spray nozzle 26 is positioned towards the hemispherical bubble 3 by the adjustable spray tube 25, which allows the present invention to guide the wiper fluid onto the hemispherical bubble 3. The spray nozzle 26 is in fluid communication with at least one bulkhead fitting 24 through the adjustable spray tube 25. The adjustable spray tube 25 is a means for the wiper fluid to travel from the at least one bulkhead fitting 24 to the spray nozzle 26. Consequently, one end of the adjustable spray tube 25 is coupled to the at least one bulkhead fitting 24, and the other end of the adjustable spray tube 25 is coupled to the spray nozzle 26. The orientation of the spray nozzle 26 can be changed by repositioning the adjustable spray tube 25, but both the spray nozzle 26 and the adjustable spray tube 25 are typically positioned adjacent to the fixed wiper assembly 16 so that the wiper blade 17 can immediately utilizes the wiper fluid to clean the hemispherical bubble 3 when the wiper fluid is ejected from the spray nozzle 26.

Figure 9:
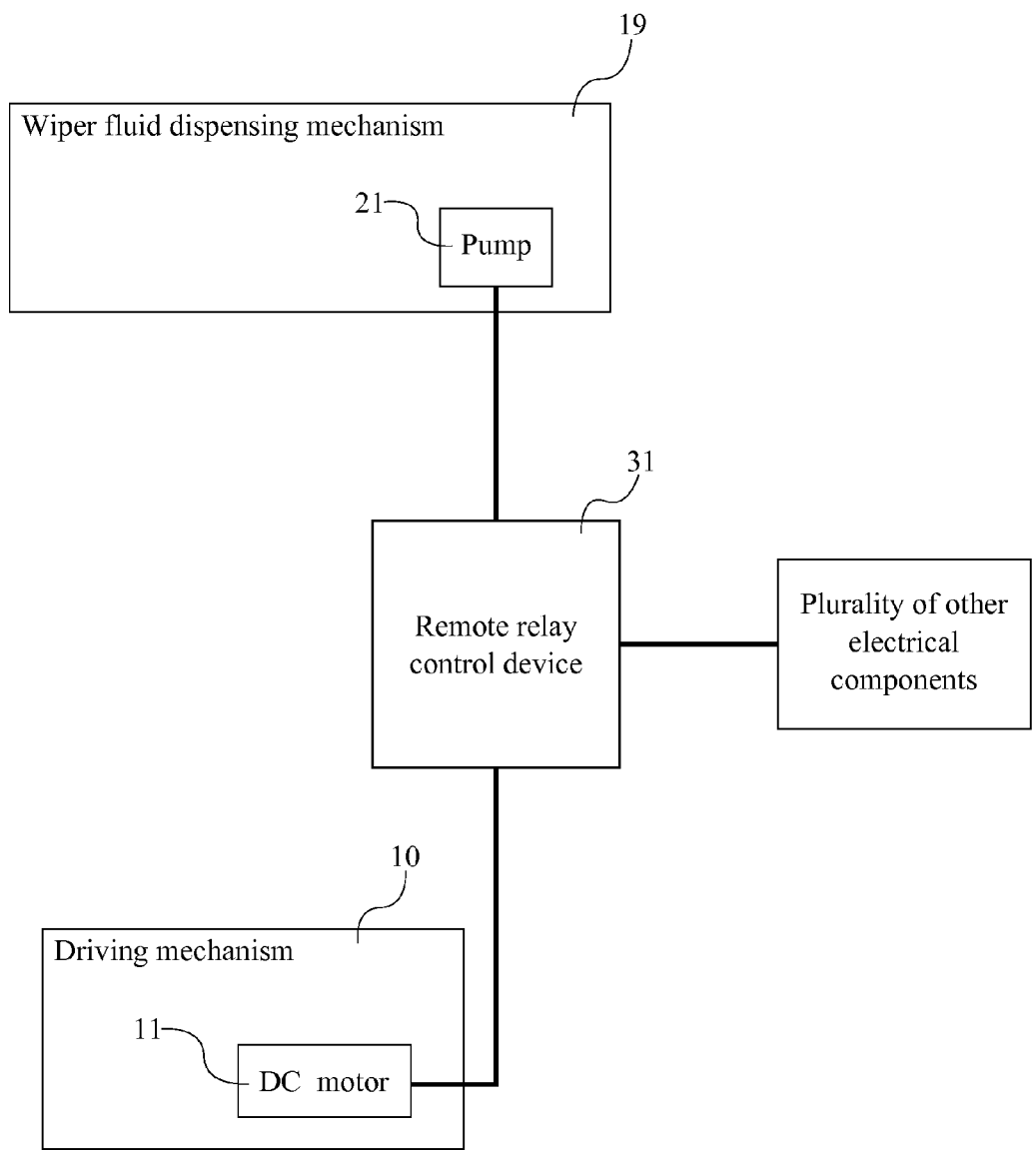
FIG. 9 is a schematic for the electrical component of the present invention.

As can be seen in FIG. 9, the electrical components of the present invention are positioned within the enclosure 27. More specifically, the remote relay control device 31 is mounted within the enclosure 27. In the preferred embodiment of the present invention, the remote relay control device 31 receives commands through wireless communication through the Internet. According to those commands, the remote relay control device 31 revolves the hemispherical bubble 3 and activates the wiper fluid dispensing mechanism 19. Thus, the remote relay control device 31 must be electronically connected to the DC motor 11 and must be electronically connected to the pump 21. The remote relay control device 31 could also function as a hub to manage smart features such as sending email alerts, temperature data, and weather-related data to a user and to allow the user to send signals back to the present invention in order to control its other electronic components.

As can be seen in FIG. 8, another electrical component is the camera assembly 1, which is also mounted within the enclosure 27. In the preferred embodiment of the present invention, the camera assembly 1 is mounted to the support section 28 by a precision camera leveling system, which improves linearity of the visual recording across its viewing area. The precision camera leveling system is able to adjust the height and the angle of the camera assembly 1 so that the camera assembly 1 is able to traverse into the lowest point of the rotatable dome 2. This allows the front lens of the camera assembly 1 can have a clear view through the rotatable dome 2. Other electronic components for the present invention could include but is not limited to a power supply, rain sensor, exterior temperature sensor, low fluid sensor, dome heating element, cooling system, switch/relay, variable speed control, and heat coil (to keep wiper fluid from freezing in the adjustable spray tube 25).

The components of the present invention can be arranged into two configurations. The first configuration of the present invention just includes the rotatable dome 2, the driving mechanism 10, and the fixed wiper assembly 16. This configuration can only be used when moisture accumulated on the outer surface of the rotatable dome 2 and begins to obstruct the view of the front lens through the rotatable dome 2. Once the rain sensor is activated, the rain sensor alerts the user via the remote relay control device that moisture is present and provides the option for the user via web interface to switch on the DC motor 11. The variable speed control allows the DC motor 11 to operate in a variable speed mode with on/off switching or to operate in variable speed mode with intermittent on/off input for light moisture conditions. The variable speed mode or intermittent mode would be determined by the user, depending upon the amount of moisture accumulation. The rain sensor will also switch off the DC motor 11 when the rain dissipates and send an alert to the user that the DC motor 11 has been switch off. In addition, if the first optional configuration is used in a sub-freezing environment, then this configuration will be equipped with a heating element, an outside temperature sensor, and a circulating fan in order to prevent moisture from freezing on the rotatable dome 2.

The second configuration of the present invention is the same as the first configuration, but the second configuration also includes the wiper fluid dispensing mechanism 19. This configuration is used when the user determines that the view of the front lens through the rotatable dome 2 is obstructed by dirt or film, and, subsequently, the rotatably dome must be cleaned. The second configuration allows the user to wipe and clean the rotatable dome 2 by activating the wiper fluid dispensing mechanism 19 via the remote relay control device 31. The power supply is used to switch on the pump 21 to begin pumping wiper fluid onto the rotatable dome 2. Moments later, the rotatable dome 2 revolves when the DC motor 11 is switch on by a power supply. The wiper fluid dispensing mechanism 19 will spray wiper fluid onto the rotatable dome 2 and will revolve for a pre-determined number of rotations. Then, the wiper fluid dispensing mechanism 19 will be switched off while the rotatable dome 2 revolves for a few additional seconds in order to remove all of the moisture from the rotatable dome 2. The revolution speed of the rotatable dome 2 and the volume amount of dispensed wiper fluid is preprogrammed with the exact ratios to ensure even cleaning and wiping. When the wiper fluid dispensing mechanism 19 is operated in sub-freezing environments, a heating device will be attached to the adjustable spray hose to prevent stagnant wiper fluid from freezing. The heating device would be controlled via an external temperature sensor either be feeding a switch within the enclosure 27 circuitry or via web remote. In addition, if the second configuration is used in a sub-freezing environment, then this configuration will be equipped with a heating element, an outside temperature sensor, and a circulating fan in order to prevent moisture from freezing on the rotatable dome 2.

Although the invention has been explained in relation to its preferred embodiment, it is to be understood that many other possible modifications and variations can be made without departing from the spirit and scope of the invention as hereinafter claimed.

What is claimed is:
1. A system for a self-cleaning/wiping protective dome being integrated into an outdoor camera housing comprises:
   a rotatable dome;
   a driving mechanism;
   a retaining spring bracket;
   a fixed wiper assembly;
   a wiper fluid dispensing mechanism;
   an enclosure;
   a remote relay control device;
   said rotatable dome comprises a hemispherical bubble, an annular flange, a plurality of gear teeth, a first race, and a plurality of ball bearings;
   said driving mechanism comprises a direct current (DC) motor and a motor gear;

said retaining spring bracket comprises a plurality of the springy portions and a annular base;
said fixed wiper assembly comprises a wiper blade and a wiper arm;
said enclosure comprises a support section, a dome hole, and a second race; and
said hemispherical bubble comprises a top rim and a bottom pole.

2. The system for a self-cleaning/wiping protective dome being integrated into an outdoor camera housing as claimed in claim 1 comprises:
said dome hole being positioned through said support section;
said second race being positioned within said enclosure;
said second race being concentrically positioned around said dome hole; and
a mounting bracket being positioned outside of said enclosure and being connected to said enclosure.

3. The system for a self-cleaning/wiping protective dome being integrated into an outdoor camera housing as claimed in claim 1 comprises:
said top rim being positioned opposite to said bottom pole on said hemispherical bubble;
said annular flange being radially positioned around said bottom pole;
said annular flange being perimetrically connected to said top rim;
said plurality of gear teeth being radially integrated around said annular flange;
said hemispherical bubble traversing through said dome hole; and
said annular flange being located within said enclosure.

4. The system for a self-cleaning/wiping protective dome being integrated into an outdoor camera housing as claimed in claim 1 comprises:
said plurality of ball bearings being evenly distributed around said hemispherical bubble and being positioned in between said annular flange and said camera mounting section;
said first race and said second race being engaged by said plurality of ball bearings;
said first race traversing into said annular flange parallel to said bottom pole;
said first race being concentrically positioned around dome hole;
said second race traversing into said camera mounting section parallel to said bottom pole; and
said second race being aligned with said first race.

5. The system for a self-cleaning/wiping protective dome being integrated into an outdoor camera housing as claimed in claim 1 comprises:
said retaining spring bracket being positioned adjacent to said annular flange opposite to said camera mounting section;
said annular base being concentrically positioned to said annular flange;
said annular base being fastened to said camera mounting section;
said plurality of springy portions being radially integrated into said annular base; and
said annular flange being pressed against said plurality of ball bearings by said plurality of springy portions.

6. The system for a self-cleaning/wiping protective dome being integrated into an outdoor camera housing as claimed in claim 1 comprises:
said DC motor and said motor gear being located within said enclosure;
said DC motor being mounted to said enclosure adjacent to said rotatably dome;
said motor gear being axially connected to said DC motor; and
said plurality of gear teeth being engaged by said motor gear.

7. The system for a self-cleaning/wiping protective dome being integrated into an outdoor camera housing as claimed in claim 1 comprises:
said fixed wiper assembly being positioned opposite to a front lens of a camera assembly around said hemispherical bubble;
said wiper arm being adjustably fastened to said enclosure adjacent to said rotatable dome;
said wiper blade being attached along said wiper arm; and
said wiper blade being lightly pressed against said hemispherical bubble.

8. The system for a self-cleaning/wiping protective dome being integrated into an outdoor camera housing as claimed in claim 1 comprises:
said wiper fluid dispensing mechanism comprises a fluid reservoir, a pump, an input tube, an output tube, an at least one bulkhead fitting, an adjustable spray tube, and a spray nozzle;
said pump being in fluid communication with said fluid reservoir through said input tube;
said remote relay control device being electronically connected to said pump;
said fluid reservoir being mounted within said enclosure;
said at least one bulkhead fitting being in fluid communication with said pump through said output tube;
said at least one bulkhead fitting traversing through and being connected to said enclosure;
said spray nozzle being in fluid communication with said at least one bulkhead fitting through said adjustable spray tube;
said spray nozzle being positioned towards said hemispherical bubble by said adjustable spray tube; and
said adjustable spray tube and said spray nozzle being positioned adjacent to said fixed wiper assembly.

9. The system for a self-cleaning/wiping protective dome being integrated into an outdoor camera housing as claimed in claim 1 comprises:
said remote relay control device being mounted within said enclosure;
said remote relay control device being electronically connected to said DC motor; and
a camera assembly being mounted within said enclosure and traversing into said rotatable dome.

10. A system for a self-cleaning/wiping protective dome being integrated into an outdoor camera housing comprises:
a rotatable dome;
a driving mechanism;
a retaining spring bracket;
a fixed wiper assembly;
a wiper fluid dispensing mechanism;
an enclosure;
a remote relay control device;
said rotatable dome comprises a hemispherical bubble, an annular flange, a plurality of gear teeth, a first race, and a plurality of ball bearings;
said driving mechanism comprises a direct current (DC) motor and a motor gear;
said retaining spring bracket comprises a plurality of the springy portions and a annular base;
said fixed wiper assembly comprises a wiper blade and a wiper arm;

said enclosure comprises a support section, a dome hole, and a second race;
said hemispherical bubble comprises a top rim and a bottom pole;
said top rim being positioned opposite to said bottom pole on said hemispherical bubble;
said annular flange being radially positioned around said bottom pole;
said annular flange being perimetrically connected to said top rim;
said plurality of gear teeth being radially integrated around said annular flange;
said hemispherical bubble traversing through said dome hole;
said annular flange being located within said enclosure;
said plurality of ball bearings being evenly distributed around said hemispherical bubble and being positioned in between said annular flange and said camera mounting section;
said first race and said second race being engaged by said plurality of ball bearings;
said first race traversing into said annular flange parallel to said bottom pole;
said first race being concentrically positioned around dome hole;
said second race traversing into said camera mounting section parallel to said bottom pole; and
said second race being aligned with said first race.

11. The system for a self-cleaning/wiping protective dome being integrated into an outdoor camera housing as claimed in claim 10 comprises:
said dome hole being positioned through said support section;
said second race being positioned within said enclosure;
said second race being concentrically positioned around said dome hole;
a mounting bracket being positioned outside of said enclosure and being connected to said enclosure;
said remote relay control device being mounted within said enclosure;
said remote relay control device being electronically connected to said DC motor; and
a camera assembly being mounted within said enclosure and traversing into said rotatable dome.

12. The system for a self-cleaning/wiping protective dome being integrated into an outdoor camera housing as claimed in claim 10 comprises:
said retaining spring bracket being positioned adjacent to said annular flange opposite to said camera mounting section;
said annular base being concentrically positioned to said annular flange;
said annular base being fastened to said camera mounting section;
said plurality of springy portions being radially integrated into said annular base;
said annular flange being pressed against said plurality of ball bearings by said plurality of springy portions;
said DC motor and said motor gear being located within said enclosure;
said DC motor being mounted to said enclosure adjacent to said rotatably dome;
said motor gear being axially connected to said DC motor; and
said plurality of gear teeth being engaged by said motor gear.

13. The system for a self-cleaning/wiping protective dome being integrated into an outdoor camera housing as claimed in claim 10 comprises:
said fixed wiper assembly being positioned opposite to a front lens of a camera assembly around said hemispherical bubble;
said wiper arm being adjustably fastened to said enclosure adjacent to said rotatable dome;
said wiper blade being attached along said wiper arm;
said wiper blade being lightly pressed against said hemispherical bubble;
said wiper fluid dispensing mechanism comprises a fluid reservoir, a pump, an input tube, an output tube, an at least one bulkhead fitting, an adjustable spray tube, and a spray nozzle;
said pump being in fluid communication with said fluid reservoir through said input tube;
said remote relay control device being electronically connected to said pump;
said fluid reservoir being mounted within said enclosure;
said at least one bulkhead fitting being in fluid communication with said pump through said output tube;
said at least one bulkhead fitting traversing through and being connected to said enclosure;
said spray nozzle being in fluid communication with said at least one bulkhead fitting through said adjustable spray tube;
said spray nozzle being positioned towards said hemispherical bubble by said adjustable spray tube; and
said adjustable spray tube and said spray nozzle being positioned adjacent to said fixed wiper assembly.

14. A system for a self-cleaning/wiping protective dome being integrated into an outdoor camera housing comprises:
a rotatable dome;
a driving mechanism;
a retaining spring bracket;
a fixed wiper assembly;
a wiper fluid dispensing mechanism;
an enclosure;
a remote relay control device;
said rotatable dome comprises a hemispherical bubble, an annular flange, a plurality of gear teeth, a first race, and a plurality of ball bearings;
said driving mechanism comprises a direct current (DC) motor and a motor gear;
said retaining spring bracket comprises a plurality of the springy portions and a annular base;
said fixed wiper assembly comprises a wiper blade and a wiper arm;
said enclosure comprises a support section, a dome hole, and a second race;
said hemispherical bubble comprises a top rim and a bottom pole;
said top rim being positioned opposite to said bottom pole on said hemispherical bubble;
said annular flange being radially positioned around said bottom pole;
said annular flange being perimetrically connected to said top rim;
said plurality of gear teeth being radially integrated around said annular flange;
said hemispherical bubble traversing through said dome hole;
said annular flange being located within said enclosure;

said plurality of ball bearings being evenly distributed around said hemispherical bubble and being positioned in between said annular flange and said camera mounting section;

said first race and said second race being engaged by said plurality of ball bearings;

said first race traversing into said annular flange parallel to said bottom pole;

said first race being concentrically positioned around dome hole;

said second race traversing into said camera mounting section parallel to said bottom pole;

said second race being aligned with said first race;

said fixed wiper assembly being positioned opposite to a front lens of a camera assembly around said hemispherical bubble;

said wiper arm being adjustably fastened to said enclosure adjacent to said rotatable dome;

said wiper blade being attached along said wiper arm; and said wiper blade being lightly pressed against said hemispherical bubble.

15. The system for a self-cleaning/wiping protective dome being integrated into an outdoor camera housing as claimed in claim 14 comprises:

said dome hole being positioned through said support section;

said second race being positioned within said enclosure;

said second race being concentrically positioned around said dome hole;

a mounting bracket being positioned outside of said enclosure and being connected to said enclosure;

said DC motor and said motor gear being located within said enclosure;

said DC motor being mounted to said enclosure adjacent to said rotatably dome;

said motor gear being axially connected to said DC motor;

said plurality of gear teeth being engaged by said motor gear;

said remote relay control device being mounted within said enclosure;

said remote relay control device being electronically connected to said DC motor; and a camera assembly being mounted within said enclosure and traversing into said rotatable dome.

16. The system for a self-cleaning/wiping protective dome being integrated into an outdoor camera housing as claimed in claim 14 comprises:

said retaining spring bracket being positioned adjacent to said annular flange opposite to said camera mounting section;

said annular base being concentrically positioned to said annular flange;

said annular base being fastened to said camera mounting section;

said plurality of springy portions being radially integrated into said annular base; and said annular flange being pressed against said plurality of ball bearings by said plurality of springy portions.

17. The system for a self-cleaning/wiping protective dome being integrated into an outdoor camera housing as claimed in claim 14 comprises:

said wiper fluid dispensing mechanism comprises a fluid reservoir, a pump, an input tube, an output tube, an at least one bulkhead fitting, an adjustable spray tube, and a spray nozzle;

said pump being in fluid communication with said fluid reservoir through said input tube;

said remote relay control device being electronically connected to said pump;

said fluid reservoir being mounted within said enclosure;

said at least one bulkhead fitting being in fluid communication with said pump through said output tube;

said at least one bulkhead fitting traversing through and being connected to said enclosure;

said spray nozzle being in fluid communication with said at least one bulkhead fitting through said adjustable spray tube;

said spray nozzle being positioned towards said hemispherical bubble by said adjustable spray tube; and said adjustable spray tube and said spray nozzle being positioned adjacent to said fixed wiper assembly.

\* \* \* \* \*